May 12, 1959 — E. A. HANYSZ — 2,885,887
ULTRASONIC TESTING
Filed Aug. 2, 1956
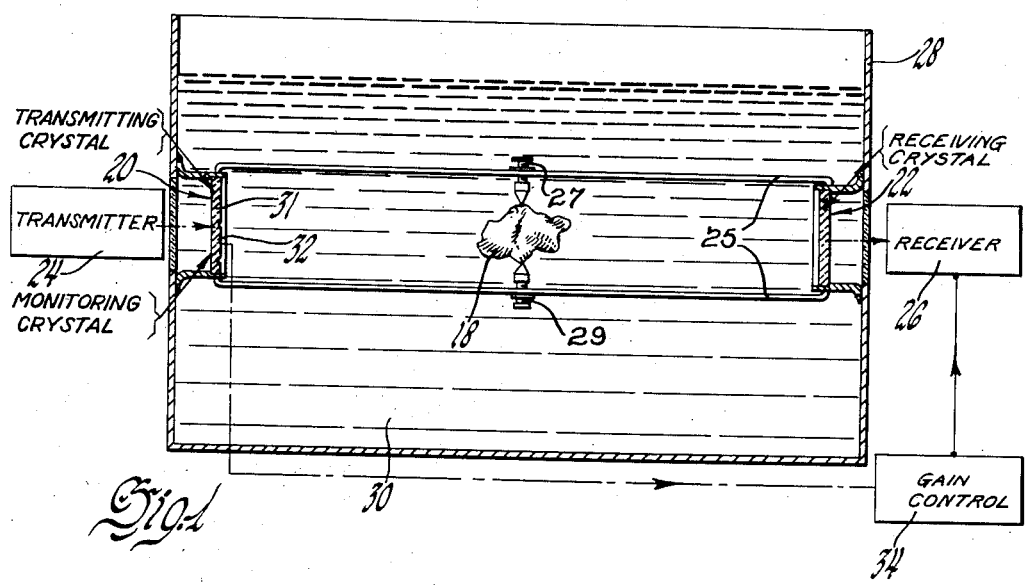
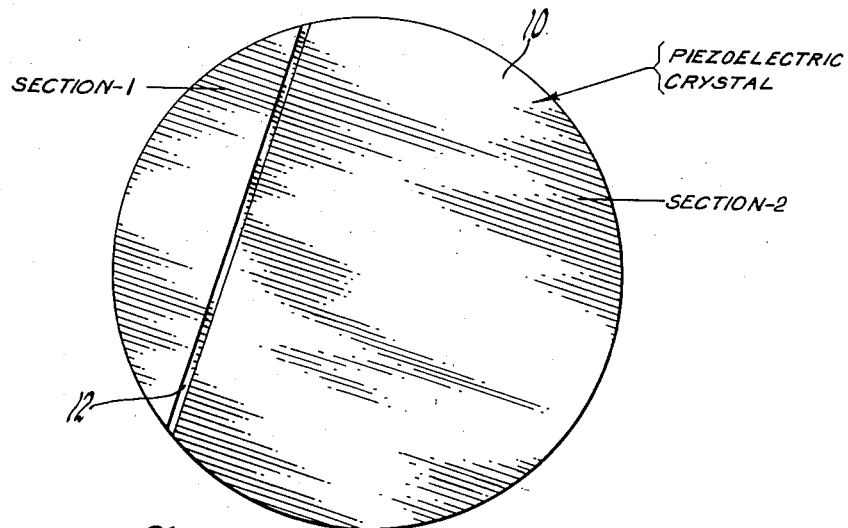
INVENTOR.
Eugene A. Hanysz
BY
ATTORNEY.

United States Patent Office 2,885,887
Patented May 12, 1959

2,885,887
ULTRASONIC TESTING

Eugene A. Hanysz, Royal Oak, Mich., assignor to General Motors Corporation, Detroit, Mich., a corporation of Delaware Application August 2, 1956, Serial No. 601,679

3 Claims. (Cl. 73—67.6)

This invention relates to an electro-mechanical parts testing system and more particularly to a parts testing system employing a transducer of the crystal type.

Crystal transducers perform various functions in changing mechanical vibrations to electric oscillations or vice versa. One example is in testing apparatus where a crystal transducer driven by an oscillator is used to project a high frequency wave beam into or through a part to test it for soundness or gage its dimensions. The same or another transducer may be used to pick up or receive the transmitted waves to provide desired readings. Since in such circumstances crystal transducers accomplish various functions, it is desirable to have a single crystal perform as many functions as are needed simultaneously.

It is therefore an object in making this invention to provide a parts testing system utilizing a multiple function crystal transducer.

It is another object in making this invention to provide a parts testing system utilizing a sectionalized crystal transducer, said sections simultaneously performing the different functions of driving and monitoring.

With these and other objects in view which will become apparent as the specification proceeds, my invention will be best understood by reference to the following specification and claims and the illustrations in the accompanying drawings, in which:

Fig. 1 is a sectional view through a high frequency testing system utilizing a crystal transducer embodying my invention together with a novel control circuit, and Fig. 2 shows a sectionalized crystal employed in my invention.

In ultrasonic testing means, crystal transducers are utilized to project high frequency test or search beams into or through parts under test, receive transmitted beams from such parts and for measuring and indicating purposes. They are also used for various control purposes. In some instances a single crystal is used for both transmitting and receiving the high frequency waves.

In the present invention, however, a sectionalized crystal is provided in which the different sections perform different required duties. For example, by taking a unitary crystal and grooving the same, different sections and suitable isolation between said sections are provided so that each may be used for a different purpose without interfering with another. A single crystal may be driven by an oscillator but different sections thereof may be used for different purposes.

Referring now more specifically to Fig. 2 there is disclosed a basic crystal 10 which is shown as being circular but which may take any configuration. This basic crystal is shown as being grooved at 12 to cut the crystal 10 into different sections identified as sections 1 and 2. The groove is cut sufficiently deep to provide partial vibratory isolation between the sections and reduce electro-mechanical coupling. Section 1 is an arcuate section which is isolated from section 2 by a straight groove. When this crystal is driven by being connected in the output of a suitable oscillator one section may be driven for transmitting and the other section used for control purposes, such as monitoring to check changes in the crystal such as those occurring from ageing.

As an illustration, Fig. 1 shows a transmission testing apparatus in which a part 18 to be tested is shown mounted between a transmitting crystal 20 on the left-hand side and a receiving crystal 22 on the right-hand side. The transmitting crystal is supplied with high frequency electrical oscillations from the oscillator or transmitter 24 and the receiving crystal is connected to a receiver 26 in which the electrical waves are amplified. The part 18 is supported in a tank 28, which is partially filled with a liquid 30 by any suitable means such as supporting brackets 25 having adjustable screw means 27 and 29 to clamp the part. The primary purpose of the liquid is to provide satisfactory coupling between the crystals and the part so that a maximum of the beamed energy may be utilized. In this type of testing apparatus the beam of ultrasonic waves is generated by the transmitting crystal 20 and projected through the part 18 to be tested and received on the receiving crystal 22. This is a comparison type of testing equipment and when adjusted with a satisfactory part in place, gives an indication of energy received at the receiver through any desired indicating means. Thereafter by the substitution of production parts to be tested, the operator can determine whether or not the amount of energy received through the part falls within an acceptable range. If the part contains flaws, cracks or occlusions, then the amount of energy received on the receiving crystal is reduced to give an indication of such fault.

It is desirable of course to maintain the indicating electronic system as stable as possible and therefore it is desirable to provide a gain control so that if the supply voltage on the transmitter or receiver increases or the crystal ages or changes, some compensation will be made to maintain a uniform output dependent only upon beam transmission through the part. If this is not provided and the supply voltage increased perceptibly or the crystal changed, faulty parts might be passed because of the greater amount of transmitted energy and the greater sensitivity of the receiver. In the present instance the transmitting crystal 20 is indicated as having two sections, a first section 31 which is used for the general generation and injection of the testing beam and the second section 32 which is used for monitoring purposes. The output of the monitor section 32, which is driven by the main section 31, may be an electric output rather than a sound wave output and may be applied to a gain control 34 of any conventional type which feeds a control signal to the receiver 26 in opposition to the received signal to tend to stabilize receiver output. The crystal 20 may have a single contact area sprayed on the ungrooved face and two separate contact areas sprayed or painted on portions 31 and 32 to thus connect the different areas into electrical circuits with the transmitter and the gain control.

Thus when the transmitter 24 is energized, a beam of high frequency sound waves is generated by the section 31 of the transmitting crystal, which beam is projected through the part to be tested to the receiving crystal for indicating purposes. At the same time section 32 of the crystal 20 is used as a monitoring crystal and its output is fed to gain control section 34 where a control voltage is generated to be applied to the receiver 26. If the voltage or output of the transmitter increases, a stronger beam will be directed through the object which would tend to give an erroneous indication in the receiver 26 of the amount of energy passing through the part. By this monitoring system, however, the greater output of the monitoring crystal section 32 would be applied to the gain control 34 and reduce the sensitivity of the receiver 26 an appropriate proportional amount so that the output of the receiver 26 would remain the same for the same soundness of part even though the energy of the transmitter had changed. A reduced transmitted wave intensity would also cause the opposite results to tend to maintain the receiver output substantially constant for sound parts.

What is claimed is:

1. In testing equipment, an oscillator for generating high frequency waves, a crystal transducer having a groove therein to provide a plurality of sections, one of said sections being connected to said oscillator to be vibrated thereby, another of said sections being vibrated by said one section to produce an electrical signal, a receiving crystal upon which rays from said one of said sections of the transmitting crystal impinge after passing through parts to be tested, amplifying means connected to the receiving crystal and indicating the strength of the signals, and gain control means connected to the amplifying means and electrically coupled to said other section of the transmitting crystal to adjust the amplifying means to provide a stabilized indication.

2. In testing equipment, a source of high frequency oscillations, a first transducer means connected to said source and driven by the same, said transducer means having a plurality of sections partially isolated from one another and sending out from one section a beam of high frequency waves adapted to pass through parts to be tested, receiving means including a second transducer mechanically coupled to and receiving signals transmitted from the one section of the first transducer means and gain control means electrically connected to another section of the first transducer means and to the receiving means to adjust the sensitivity of the receiving means dependent upon the strength of the source of high frequency oscillations.

3. In testing equipment, an oscillator for generating high frequency waves, a crystal transducer connected to the ouput of the oscillator and having a groove therein to provide a plurality of sections partially isolated from one another, said sections producing vibration and electrical signals respectively, and a plurality of signal responsive means, one responsive to vibration and another electrically connected to the section of the crystal transducer producing electrical signals, amplifying means connected to the vibration signal responsive means, said electrical signal responsive means being connected to and controlling the amplifying means to monitor the output thereof.

References Cited in the file of this patent

UNITED STATES PATENTS

| | | |
|---|---|---|
| 2,543,500 | Kettering et al. | Feb. 27, 1951 |
| 2,700,895 | Carson | Feb. 1, 1955 |
| 2,716,708 | Bradfield | Aug. 30, 1955 |